(12) United States Patent
Kuromizu

(10) Patent No.: US 9,791,739 B2
(45) Date of Patent: Oct. 17, 2017

(54) LIGHT SOURCE DEVICE AND DISPLAY APPARATUS

(71) Applicant: Sakai Display Products Corporation, Sakai-shi, Osaka (JP)

(72) Inventor: Yasumori Kuromizu, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/908,445

(22) PCT Filed: Jul. 30, 2013

(86) PCT No.: PCT/JP2013/070532
§ 371 (c)(1),
(2) Date: Jan. 28, 2016

(87) PCT Pub. No.: WO2015/015558
PCT Pub. Date: Feb. 5, 2015

(65) Prior Publication Data
US 2016/0170266 A1    Jun. 16, 2016

(51) Int. Cl.
*G09F 13/04*   (2006.01)
*G02F 1/1335*  (2006.01)
(Continued)

(52) U.S. Cl.
CPC .. *G02F 1/133611* (2013.01); *G02F 1/133603* (2013.01); *G02F 1/133605* (2013.01);
(Continued)

(58) Field of Classification Search
CPC ......... G02F 1/133611; G02F 1/133603; G02F 1/133605; G02F 1/133606; G02F 1/133608; G02F 2001/133322; G02B 6/0086; G02B 6/0088; G02B 6/0051; G02B 6/0055; G02B 6/0061; G02B 6/0045
See application file for complete search history.

(56) References Cited

U.S. PATENT DOCUMENTS

2006/0268579 A1* 11/2006 Han ................ G02B 6/0051
                                                362/629
2007/0086179 A1*  4/2007 Chen ............... G02B 6/0021
                                                362/23.1
(Continued)

FOREIGN PATENT DOCUMENTS

JP    2012-084303 A    4/2012

*Primary Examiner* — Y M. Lee
(74) *Attorney, Agent, or Firm* — Bret E. Field; Bozicevic, Field & Francis LLP

(57) ABSTRACT

A light source device which includes a light source, a diffusion member configured to diffuse light from the light source, a reflection sheet configured to reflect the light from the light source to the diffusion member, a storage housing in which the diffusion member and the reflection sheet are stored to face each other, and positioning parts configured to position the diffusion member and the reflection sheet in the storage housing is provided. And the reflection sheet is provided with convex parts in one edge part thereof at positions corresponding, in a facing direction, to notches of the diffusion member which correspond to the positioning parts, such that light reflectance in the vicinity of the notches of the diffusion member is increased.

18 Claims, 10 Drawing Sheets

(51) Int. Cl.
*F21V 8/00* (2006.01)
*G02F 1/1333* (2006.01)

(52) U.S. Cl.
CPC ...... *G02F 1/133606* (2013.01); *G02B 6/0051* (2013.01); *G02B 6/0055* (2013.01); *G02B 6/0086* (2013.01); *G02B 6/0088* (2013.01); *G02F 1/133608* (2013.01); *G02F 2001/133322* (2013.01)

(56) References Cited

U.S. PATENT DOCUMENTS

| | | | | |
|---|---|---|---|---|
| 2009/0168404 A1* | 7/2009 | Matsukawa | ....... | G02F 1/133604 362/97.2 |
| 2010/0309408 A1* | 12/2010 | Fukuda | ............. | G02F 1/133605 349/62 |
| 2010/0328362 A1* | 12/2010 | Song | .................... | G02B 6/0038 345/690 |
| 2012/0081351 A1* | 4/2012 | Yokota | ............. | G02F 1/133608 345/211 |

* cited by examiner

LIGHT SOURCE DEVICE AND DISPLAY APPARATUS

This application is the national phase under 35 U.S.C. §371 of PCT International Application No. PCT/JP2013/070532 which has an International filing date of Jul. 30, 2013 and designated the United States of America.

BACKGROUND

1. Technical Field

The present invention relates to a light source device which includes a light source, a diffusion member for diffusing light from the light source, a reflection sheet for reflecting the light from the light source to the diffusion member, a storage housing in which the diffusion member and the reflection sheet are stored to face each other, and positioning parts for positioning the diffusion member and the reflection sheet in the storage housing, and a display apparatus including the light source device.

2. Description of Related Art

Recently, a display apparatus such as a liquid crystal television has been widely distributed. Such a display apparatus includes a light guide plate, and the light guide plate planarly propagates light from a light source inside thereof and irradiates the light toward a display panel which displays an image. Meanwhile, it is necessary to prevent a position shift of the light guide plate in order to properly irradiate the display panel with light, and generally, the position of the light guide plate is fixed by using positioning parts, and the light guide plate has notch parts formed at positions corresponding to the positioning parts.

However, when fixing the position of the light guide plate by using the positioning parts, the light propagating inside the light guide plate, for example, is reflected by the positioning parts, such that unintended reflected light is generated around the notches and the reflected light is emitted to the display panel through the light guide plate, or a reflectance of light may be changed at a portion relating to the notches.

Thereby, unevenness in luminance occurs in the display panel.

To solve the above problems, Japanese Patent Laid-open Publication No. 2012-84303 discloses a light source module in which positioning parts are covered with a coating film which has a lower reflectance for light from the light source than that of the positioning part itself, thereby preventing an occurrence of unevenness in luminance due to reflection around the notch parts of the light guide plate.

SUMMARY

However, the light source module of Japanese Patent Laid-open Publication No. 2012-84303 corresponds to a so-called edge type display apparatus having the light guide plate, and it may not be applied to a direct type display apparatus which does not have the light guide plate.

That is, in the vicinity of the notches formed in the diffusion plate of the direct type display apparatus, due to the diffusion plate being cut out, it is not possible to cope with a problem that such the portion is observed by a user as a dark region or luminance unevenness.

In consideration of the above-mentioned circumstances, it is an object of the present invention to provide a light source device which includes a light source, a diffusion member configured to diffuse light from the light source, a reflection sheet configured to reflect the light from the light source to the diffusion member, a storage housing in which the diffusion member and the reflection sheet are stored to face each other, and positioning parts provided in the storage housing and configured to position the diffusion member and the reflection sheet in the storage housing, wherein the reflection sheet is provided with convex parts in one edge part thereof at positions corresponding, in a facing direction, to notches of the diffusion member which correspond to the positioning parts, such that light reflectance in the vicinity of the notches of the diffusion member is increased, and a problem that a dark region or luminance unevenness appears in the vicinity of the notches due to cutting off of the diffusion member may be solved, and a display apparatus including the same.

According to one aspect of the present invention, there is provided a light source device which includes a light source, a diffusion member configured to diffuse light from the light source, a reflection sheet configured to reflect the light from the light source to the diffusion member, a storage housing in which the diffusion member and the reflection sheet are stored to face each other, and positioning parts which are provided in the storage housing and position the diffusion member and the reflection sheet in the storage housing, wherein the diffusion member is provided with notches corresponding to the positioning parts in one side surface part thereof, the reflection sheet has concaves and convexes in one edge part corresponding to the one side surface part of the diffusion member, and the notches of the diffusion member are disposed to correspond to convex parts of the one edge part of the reflection sheet in the facing direction.

In the present invention, the notches of the diffusion member corresponding to the positioning parts are disposed at positions corresponding to the convex parts of the one edge part of the reflection sheet in the facing direction, such that the light reflectance in the vicinity of the notches of the diffusion member is increased.

According to one aspect of the present invention, there is provided a light source device which includes a light source, a diffusion member configured to diffuse light from the light source, a reflection sheet configured to reflect the light from the light source to the diffusion member, a storage housing in which the diffusion member and the reflection sheet are stored to face each other, and positioning parts which are provided in the storage housing and position the diffusion member and the reflection sheet in the storage housing, wherein the diffusion member is provided with notches corresponding to the positioning parts in one side surface part thereof, the diffusion member has residual part other than the notches of the one side surface part, which faces a bottom of the storage housing in the facing direction, and a film is formed on a portion of the bottom of the storage housing, the portion facing the residual part, and has a lower reflectance than the other portions.

In the present invention, the residual part of the diffusion member faces the bottom of the storage housing in the facing direction, and the film having a low reflectance is formed on the portion facing the residual part of the bottom of the storage housing, thereby decreasing the light reflectance relating to the residual part.

According to one aspect of the present invention, there is provided a display apparatus comprising: the light source device according to any one of claims 1 to 6, and a display panel which is provided on one surface side of the diffusion member, and displays an image using light made incident thereon through the diffusion member.

In the present invention, the display panel displays a prescribed image using the light which is emitted from the one surface of the diffusion member of the light source device and made incident on the display panel.

According to the present invention, the reflection sheet is provided with the convex parts in one edge part thereof at positions corresponding, in the facing direction, to the notches of the diffusion member which correspond to the positioning parts, such that the light reflectance in the vicinity of the notches of the diffusion member is increased, and the problem that the dark region or luminance unevenness appears in the vicinity of the notches due to cutting off of the diffusion member may be solved.

The above and further objects and features will move fully be apparent from the following detailed description with accompanying drawings.

DETAILED DESCRIPTION

Hereinafter, a case in which a light source device and a display apparatus according to embodiments of the present invention are applied to a so-called liquid crystal television including a liquid crystal display panel will be described in detail as an example, with reference to the accompanying drawings.

Embodiment 1

Figure 1:
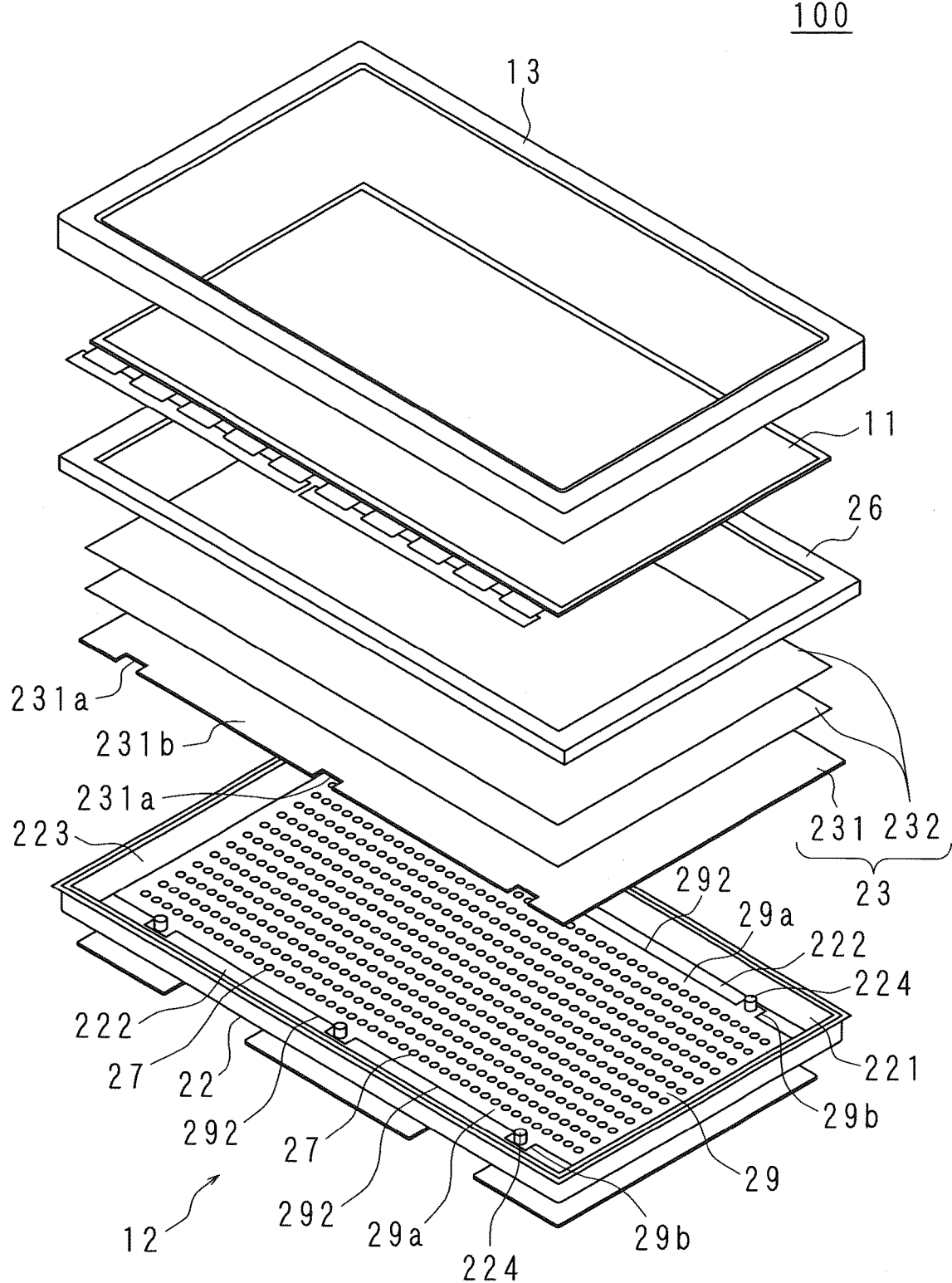
FIG. 1 is an exploded perspective view illustrating a configuration of main components of a liquid crystal television according to Embodiment 1 of the present invention.
Figure 2:
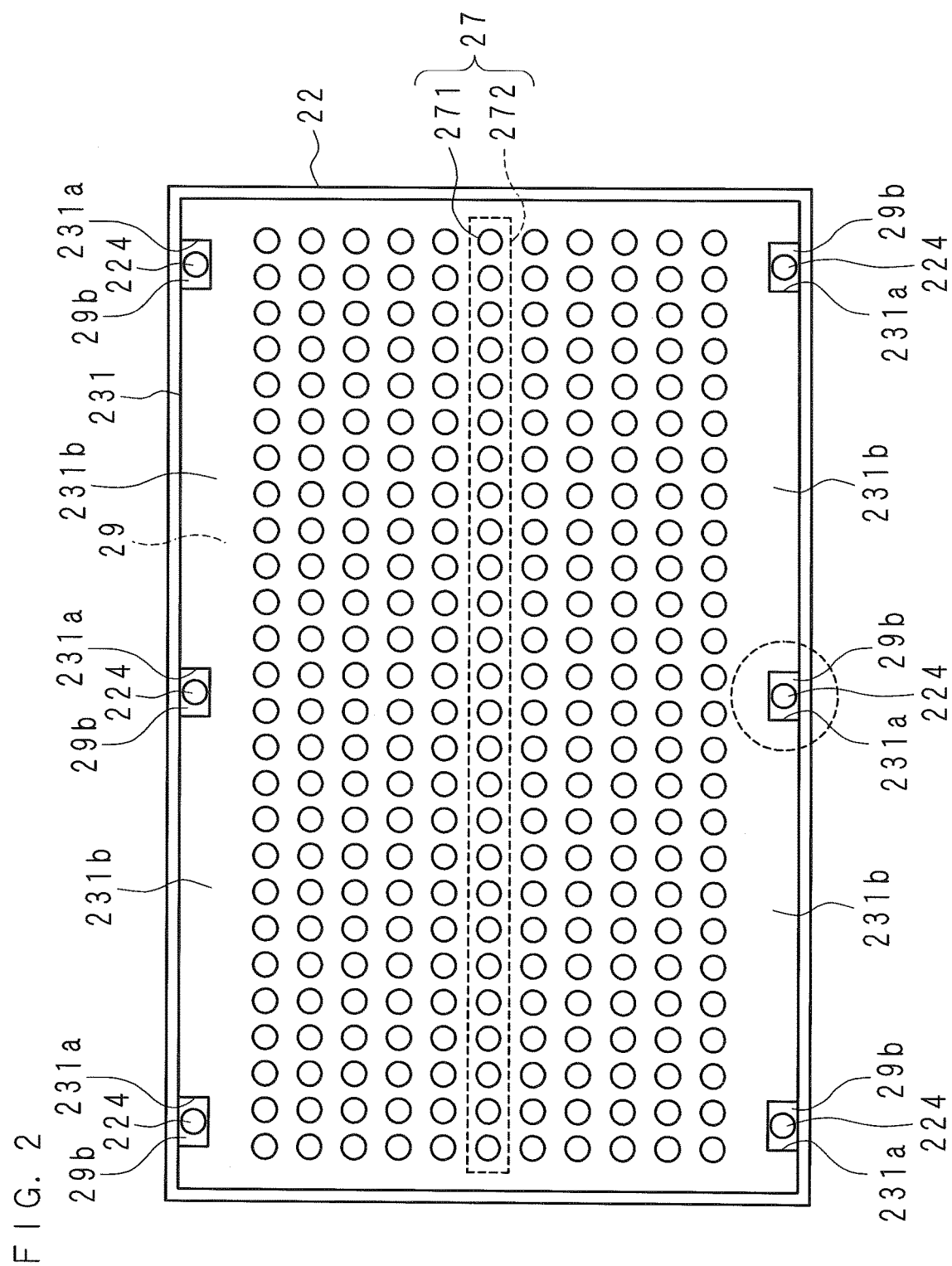
FIG. 2 is a view schematically illustrating a state in which a diffusion plate and a reflection sheet are stored, in the liquid crystal television according to Embodiment 1 of the present invention.

FIG. 1 is an exploded perspective view illustrating a configuration of main components of a liquid crystal television according to Embodiment 1 of the present invention, and FIG. 2 is a view schematically illustrating a state in which a diffusion plate and a reflection sheet are stored, in the liquid crystal television according to Embodiment 1 of the present invention. In the drawings, a liquid crystal television 100 according to the embodiments of the present invention is illustrated.

The liquid crystal television 100 according to Embodiment 1 of the present invention is formed in a laterally long rectangular shape as a whole, and for the convenience of explanation, a long-side direction and a short-side direction thereof are referred to as a horizontal direction and a vertical direction, respectively. The liquid crystal television 100 includes a liquid crystal panel 11 which is a display panel, an optical member 23, and a backlight device 12.

The liquid crystal panel 11 has a configuration in which a pair of transparent glass substrates are bonded together while being separated from each other with a prescribed gap, and a liquid crystal layer is sealed between both glass substrates. One glass substrate is provided with switching elements (for example, TFTs) connected with source wirings and the gate wirings which are orthogonal to each other, pixel electrodes connected to the switching elements, as well as an alignment film and the like, and the other glass substrate is provided with color filters in which each colored part such as RGB, etc. is disposed in a prescribed arrangement, counter electrodes, as well as an alignment film and the like. Further, polarizers (not illustrated) are arranged on the outside of both glass substrates. A front peripheral edge part of the liquid crystal panel 11 is covered with a hollow rectangular bezel 13.

The backlight device 12 is provided with an opening 221 opened toward the liquid crystal panel 11 side, and has a box-shaped backlight chassis 22 provided with a light source to be described below. The opening 221 of the backlight chassis 22 is covered with an optical member 23. In addition, a frame 26 is provided along an outer edge part of the backlight chassis 22, and the optical member 23 is configured so as to be stored in the backlight chassis 22.

Further, a light source 27 is disposed inside of the backlight chassis 22 at a position directly below the optical member 23. The light source 27 includes, for example, a plurality of LEDs 271, a substrate 272 on which the plurality of LEDs 271 are mounted, diffusion lenses attached at positions corresponding to each LED 271 in the substrate 272. That is, the liquid crystal television 100 according to Embodiment 1 is a so-called direct type.

In addition, a reflection sheet 29 for reflecting light in the backlight chassis 22 emitted from the light source 27 to the optical member 23 side is laid inside of the backlight chassis 22, so as to cover the substrate 272 of the light source 27.

The backlight chassis 22 is made of metal, and includes a bottom 222 formed in a rectangular shape substantially the same as the liquid crystal panel 11, and side walls 223 which vertically stand from the edges of each side of the bottom 222 toward the liquid crystal panel 11. Therefore, the backlight chassis 22 forms a shallow box shape as a whole whose one surface is open toward the liquid crystal panel 11.

In addition, the backlight chassis 22 has positioning parts 224, 224, . . . and 224 which protrude near the side walls 223 on a side of long-sides of the bottom 222. The positioning parts 224, 224, . . . and 224 are configured to position a diffusion plate 231 and the reflection sheet 29 in the backlight chassis 22, during they are stored into the backlight chassis 22.

Each positioning part 224 is formed in a cylindrical shape whose central axis is parallel to a thickness direction of the reflection sheet 29, and is provided near the side walls 223 inside of the backlight chassis 22. Notches 231a, 231a, . . . and 231a to be described below are formed in the diffusion plate 231, and convex parts 29b, 29b, . . . and 29b to be described below are formed in the reflection sheet 29, so as to correspond to the positioning parts 224, 224, . . . and 224 of the backlight chassis 22.

The optical member 23 is formed in a rectangular shape copying the liquid crystal panel 11. The optical member 23 covers the opening 221 of the backlight chassis 22, and is arranged between the liquid crystal panel 11 and the light source 27. The optical member 23 includes the diffusion plate 231 arranged on the light source 27 side, and an optical sheet 232 arranged on the liquid crystal panel 11 side.

The diffusion plate 231 has a configuration in which a number of diffusion particles are dispersed on a plate-shaped substrate which is made of almost transparent resin and has a prescribed thickness, to diffuse light made incident from the light source 27 side. The optical sheet 232 is formed in a sheet shape having a thinner thickness than the diffusion plate 231, in which two sheets are arranged by stacking. As the optical sheet 232, there is, for example, a diffusion sheet, a lens sheet, a reflection type polarizing sheet or the like.

In addition, the diffusion plate 231 has a rectangular shape copying the bottom 222 of the backlight chassis 22, and the notches 231a, 231a, . . . and 231a are formed at three places of the edge part of each long-side, so as to correspond to the positioning parts 224, 224, . . . and 224 of the backlight chassis 22. The notches 231a, 231a, . . . and 231a are provided at appropriate positions, so as to be engaged with the positioning parts 224, 224, . . . and 224, when the diffusion plate 231 is stored in the backlight chassis 22. For example, the shape of the concave parts corresponding to the notches 231a, 231a, . . . and 231a is formed in a rectangular shape in the thickness direction of the diffusion plate 231.

The frame 26 illustrated in FIG. 1 is formed in a hollow rectangular shape along the peripheral edge part of the liquid crystal panel 11 and the optical member 23. The frame 26 is configured so as to cover the peripheral edge part of the optical member 23, and the frame 26 holds the peripheral edge part of the liquid crystal panel 11 between the bezel 13.

The light source 27 is a so-called top type wherein a surface of a side opposite to a mounting surface of the substrate 272 becomes a light emitting surface. In addition, the LED 271 includes an LED chip which emits blue light as a light emitting source, and green and red fluorescent bodies as a fluorescent body which are excited by the blue light to emit light.

In addition, the substrate 272 of the light source 27 is formed in a strip shape, and the plurality of substrates 272 are provided on the bottom 222 of the backlight chassis 22. The plurality of substrates 272 are arranged in parallel in the short-side direction, so that the long-side direction thereof is laid in the long-side direction of the backlight chassis 22. An arrangement pitch of each substrate 272 is substantially constant.

Further, the diffusion lens of the light source 27 is made of a highly transparent synthetic resin material (for example, polycarbonate or acrylic, etc.) having a refractive index higher than that of air. The diffusion lens emits light with enhanced directivity emitted from the LEDs 271 while providing light diffusion. Therefore, since the directivity of the light emitted from the LEDs 271 is alleviated through the diffusion lens, a region between the LEDs 271 adjacent to each other becomes hard to be observed as a dark region, even if an interval therebetween is widened.

The reflection sheet 29 is made of a synthetic resin, and has a reflection surface exhibiting white color with excellent reflectivity of light at a surface on the optical member 23 side. The reflection sheet 29 has a size which is laid over an almost entire area of the bottom 222 of the backlight chassis 22, and is configured so as to cover the plurality of substrates 272 arranged in parallel in the backlight chassis 22 from a front (light emitting surface side) thereof.

In more detail, the reflection sheet 29 covers the plurality of substrates 272, and the LEDs 271 (diffusion lenses) are provided on a front surface side of the reflection sheet 29. By this reflection sheet 29, it is possible to efficiently reflect the light in the backlight chassis 22 emitted from the light source 27 toward the optical member 23 side.

In addition, the reflection sheet 29 has a rectangular bottom part 29a which is laid along the bottom 222 of the backlight chassis 22, and covers a large portion of the bottom 222, and a plurality of convex parts 29b, 29b, . . . and 29b which extend from each long-side of the bottom part 29a. Further, concave parts 292 are formed due to the convex parts 29b at a side of the long-side of the bottom part 29a between the convex parts 29b in relation thereto.

The bottom part 29a has a dimension in the long-side direction thereof equal to that of the bottom 222, and a dimension in the short-side direction slightly smaller than that of the bottom 222. Therefore, a part of the bottom 222 is exposed on a side of the long-side of the reflection sheet 29, and such the exposed portion faces the diffusion plate 231.

The respective convex part 29b is appropriately provided on the long-side of the bottom part 29a at positions corresponding to the positioning parts 224, 224, . . . and 224 of the backlight chassis 22, in other words, at positions matching with the positioning parts 224, 224, . . . and 224, when the reflection sheet 29 is stored in the backlight chassis 22.

Further, each convex part 29b is formed in a rectangular shape, and has a through hole 291 formed in a central part thereof by penetrating the reflection sheet 29 in the thickness direction thereof. The through hole 291 has a circular shape having a diameter substantially the same as an outer diameter of the positioning part 224, and the through hole 291 is fitted to an outer circumference of the positioning part 224, such that the reflection sheet 29 in the backlight chassis 22 is positioned.

Figure 3:
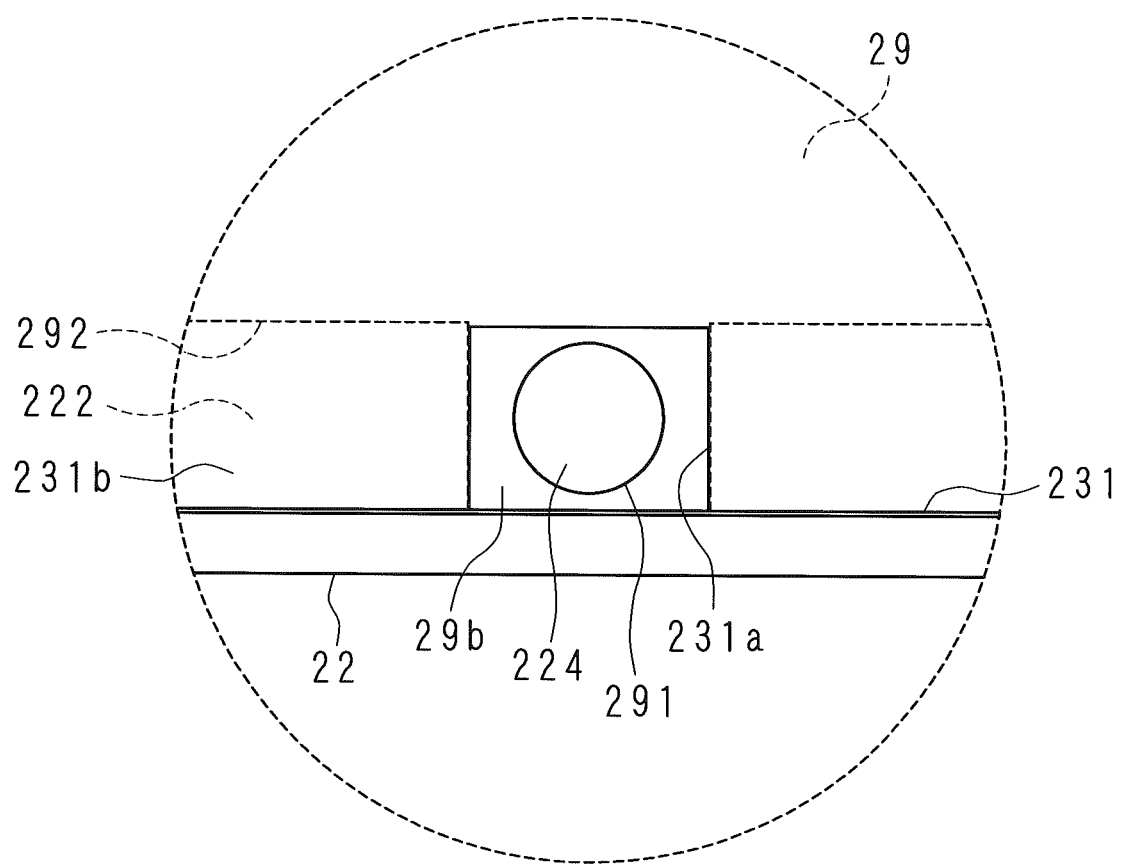
FIG. 3 is an enlarged view of a circle portion in FIG. 2.

FIG. 3 is an enlarged view of a circle portion in FIG. 2.

The diffusion plate 231 and the reflection sheet 29 are configured in such a manner that, when they are stored in the backlight chassis 22, in a direction in which they face each other, as described above, the positions of the through holes 291, 291 and 291 of the reflection sheet 29 and the positioning parts 224, 224, . . . and 224 match with each other, and each through hole 291 is fitted to an outer circumference of each positioning part 224.

Further, when the diffusion plate 231 is stored in the backlight chassis 22, the notches 231a, 231a, . . . and 231a of the diffusion plate 231 are engaged with the positioning parts 224, 224, . . . and 224. Accordingly, by the positioning part 224, the position of the diffusion plate 231 in the backlight chassis 22 is also determined. Therefore, in the present invention, a position shift of the diffusion plate 231 and the reflection sheet 29 may be prevented.

Meanwhile, in a facing direction in which the diffusion plate 231 and the reflection sheet 29 face each other, the shape of each convex part 29b of the reflection sheet 29, and the shape of the concave part due to each notch 231a of the diffusion plate 231 are a rectangular shape having a size substantially equal to each other, and these parts are disposed so as to match with each other.

Further, in the edge part of the long-side of the diffusion plate 231, portion in which the notches 231a, 231a, . . . and 231a are not formed (residual edge part 231b) is disposed so as to match with the concave parts 292 between the convex parts 29b on the long-side of the reflection sheet 29 in the facing direction.

Furthermore, the light source device according to the present invention, for example, includes the diffusion plate 231 and the backlight device 12.

Due to having the above-described configuration, in the liquid crystal television 100 according to Embodiment 1 of the present invention, as described above, it is possible to prevent the concave parts due to the notches from being observed by a viewer as dark regions, which will be described in detail below with reference to FIG. 3.

Even if the notch is provided in the diffusion plate, when the diffusion plate and the reflection sheet have the substantially equal size to each other, since the diffusion plate is absent in the notch, irregular reflection of light from the light source does not occur, but internal irregular reflection of the diffusion plate occurs around the notch, and the light irregularly reflected in this way is reflected by a portion of the reflection sheet corresponding to the notch to the display panel side. As a result, a problem, in which the concave parts due to the notches without relative irregular reflection are observed by the viewer as the dark regions, occurs.

However, in the liquid crystal television 100 according to Embodiment 1 of the present invention, it is possible to solve such the problem due to having the above-described configuration.

That is, in the liquid crystal television 100 according to Embodiment 1 of the present invention, in the direction in which the diffusion plate 231 and the reflection sheet 29 face each other, the convex parts 29b, 29b, . . . and 29b of the reflection sheet 29 are disposed at the positions corresponding to the notches 231a, 231a, . . . and 231a of the diffusion plate 231. Further, in the facing direction, the concave part 292 of the reflection sheet 29 is disposed at a position corresponding to the residual edge part 231b of the diffusion plate 231.

Therefore, in the vicinity of the concave parts due to the notches 231a, 231a, . . . and 231a of the diffusion plate 231, light reflectance is increased by the convex parts 29b, 29b, . . . and 29b of the reflection sheet 29. In addition, the concave part 292 of the reflection sheet 29 is disposed at the position corresponding to the residual edge part 231b of the diffusion plate 231, and the bottom 222 of the backlight chassis 22 is exposed, such that the light reflectance is decreased. Thereby, it is possible to prevent an occurrence of unevenness in an end part of the long-side of the diffusion plate 231, and maintain good display quality.

Further, the present invention is not limited to the above description. The convex parts 29b, 29b, . . . and 29b of the reflection sheet 29 may be configured so as to include a fluorescent agent, and the fluorescent agent may have a constant reflection spectral distribution characteristic.

The fluorescent agent includes, for example, a bis(triazinyl amino), stilbene disulfonic acid derivative, a bisstyryl biphenyl derivative, or the like, and is applied to the convex parts 29b, 29b, . . . and 29b of the reflection sheet 29, for example. In addition to the above-described fluorescent agent, the fluorescent agent such as YAG, BAM, SCA, LAP, YOX, or the like may be used.

As described above, by applying the fluorescent agent to the convex parts 29b, 29b, . . . and 29b of the reflection sheet 29, the fluorescent agent is excited by the blue emitting component from the LEDs 271 or the ultraviolet rays from the outside, and the amount of light in the convex parts 29b, 29b, . . . and 29b is increased. Therefore, the dark unevenness becomes hard to be observed by the viewer.

Herein, the reflection spectral distribution characteristic being constant means that the reflectance of an object in a visible light range (380 nm to 780 nm) is constant.

In addition, as described above, since the fluorescent agent has a constant reflection spectral distribution characteristic, localized coloring may be avoided. That is, by increasing the reflectance, the amount of light in the notches 231a, 231a, . . . and 231a of the diffusion plate 231 is increased, and thereby the display unevenness becomes hard to be observed by the viewer.

Embodiment 2

In the liquid crystal television 100 according to Embodiment 1, the case that, in the direction in which the diffusion plate 231 and the reflection sheet 29 face each other, the shape of each convex part 29b of the reflection sheet 29, and the shape of the concave part due to each notches 231a of the diffusion plate 231 are the rectangular shape having the size substantially equal to each other, and these parts are disposed so as to match with each other has been described as an example, but the present invention is not limited thereto.

Figure 4:
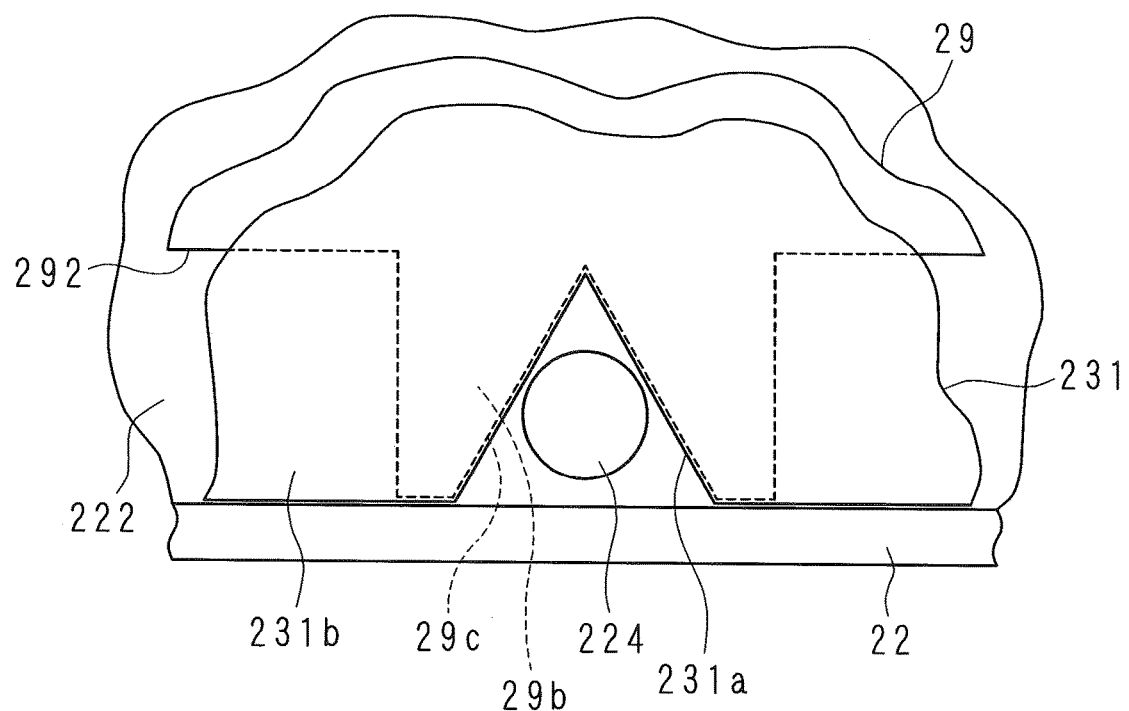
FIG. 4 is a partial view schematically illustrating a state in which a diffusion plate and a reflection sheet are stored, in a liquid crystal television according to Embodiment 2 of the present invention.

FIG. 4 is a partial view schematically illustrating a state in which a diffusion plate 231 and a reflection sheet 29 are stored, in a liquid crystal television 100 according to Embodiment 2 of the present invention.

In the liquid crystal television 100 according to Embodiment 2 of the present invention, the diffusion plate 231 has a rectangular shape copying the bottom 222 of the backlight chassis 22, and notches 231a, 231a, . . . and 231a are formed at three places of the edge part of each long-side, so as to correspond to the positioning part 224, 224, . . . and 224 of the backlight chassis 22. The notches 231a, 231a, . . . and 231a are provided at appropriate positions, so as to be engaged with the positioning parts 224, 224, . . . and 224, when the diffusion plate 231 is stored in the backlight chassis 22.

In the liquid crystal television 100 according to Embodiment 2 of the present invention, the shape of the concave parts due to the notches 231a, 231a, . . . and 231a is formed so as to be, for example, a triangle in the thickness direction of the diffusion plate 231.

In addition, the reflection sheet 29 has, similar to Embodiment 1, the plurality of convex parts 29b, 29b, . . . and 29b which extend from each long-side of the bottom part 29a, and the shape of each convex part 29b is a substantially rectangular shape as a whole.

However, in the liquid crystal television 100 according to Embodiment 2 of the present invention, triangular lacking parts 29c copying the notches 231a, 231a, . . . and 231a are formed in each convex part 29b. In other words, the lacking parts 29c, 29c, . . . and 29c are formed so that the shape of the concave part thereof is a triangle in the thickness direction of the reflection sheet 29. Each lacking part 29c is fitted to the outer circumference of the positioning part 224, such that the reflection sheet 29 is positioned in the backlight chassis 22.

Due to having the above-described configuration, in the liquid crystal television 100 according to Embodiment 2 of the present invention, as described above, it is possible to prevent the concave parts due to the notches from being observed by the viewer as the dark regions, which will be described in detail below with reference to FIG. 4.

That is, in the liquid crystal television 100 according to Embodiment 2 of the present invention, in the direction in which the diffusion plate 231 and the reflection sheet 29 face each other, the lacking parts 29c, 29c, . . . and 29c are disposed in the convex parts 29b, 29b, . . . and 29b of the reflection sheet 29, at the positions corresponding to the notches 231a, 231a, . . . and 231a of the diffusion plate 231. Further, in the facing direction, the concave part 292 of the reflection sheet 29 is disposed at the position corresponding to the residual edge part 231b of the diffusion plate 231.

Therefore, in the vicinity of the concave parts due to the notches 231a, 231a, . . . and 231a of the diffusion plate 231, the light reflectance is increased by the convex parts 29b, 29b, . . . and 29b of the reflection sheet 29. In addition, the concave part 292 of the reflection sheet 29 is disposed at the position corresponding to the residual edge part 231b of the diffusion plate 231, and the bottom 222 of the backlight chassis 22 is exposed, such that the light reflectance is decreased. Thereby, it is possible to prevent an occurrence of unevenness in the end part of the long-side of the diffusion plate 231, and maintain good display quality.

Further, in the liquid crystal television 100 according to Embodiment 2 of the present invention, the shape of the concave parts due to the notches 231a, 231a, . . . and 231a is formed so as to be, for example, a triangle in the thickness direction of the diffusion plate 231. Therefore, as compared to the case that the shape of such the concave part is a rectangle, it is possible to reduce a corner portion which may become the dark region.

Further in the liquid crystal television 100 according to Embodiment 2 of the present invention, the triangular lacking parts 29c copying the notches 231a, 231a, . . . and 231a are formed in each convex part 29b. In general, the dark region appears as a form close to the shape of the notch of the diffusion plate 231, however, by providing the lacking part 29c as described above, the property of concealing the unevenness due to the dark region caused by the notch may be more increased. That is, a inversion phenomenon which is generated by the local dark region may be avoided.

The same parts as those in Embodiment 1 will be denoted by the same reference numerals, and will not be described in detail.

Embodiment 3

In the liquid crystal television 100 according to Embodiment 1, the case that, in the direction in which the diffusion plate 231 and the reflection sheet 29 face each other, the shape of each convex part 29b of the reflection sheet 29, and the shape of the concave part due to each notch 231a of the diffusion plate 231 are the rectangular shape having the size substantially equal to each other, and these parts are disposed so as to match with each other has been described as an example, but the present invention is not limited thereto.

Figure 5:
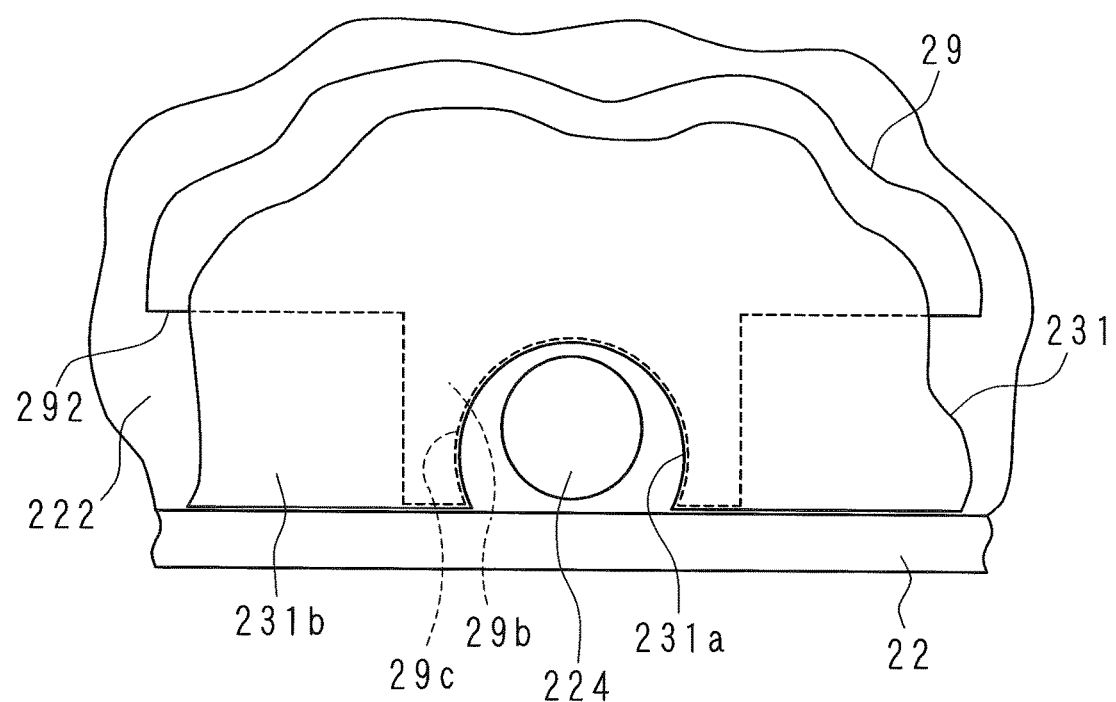
FIG. 5 is a partial view schematically illustrating a state in which a diffusion plate and a reflection sheet are stored, in a liquid crystal television according to Embodiment 3 of the present invention.

FIG. 5 is a partial view schematically illustrating a state in which a diffusion plate 231 and a reflection sheet 29 are stored, in a liquid crystal television 100 according to Embodiment 3 of the present invention.

In the liquid crystal television 100 according to Embodiment 3 of the present invention, the diffusion plate 231 has notches 231a, 231a, . . . and 231a which are formed at three places of the edge part of each long-side, so as to correspond to the positioning parts 224, 224, . . . and 224 of the backlight chassis 22. The notches 231a, 231a, . . . and 231a are provided at appropriate positions, so as to be engaged with the positioning parts 224, 224, . . . and 224, when the diffusion plate 231 is stored in the backlight chassis 22.

In the liquid crystal television 100 according to Embodiment 3 of the present invention, the shape of the concave parts due to the notches 231a, 231a, . . . and 231a is formed so as to be, for example, a circle in the thickness direction of the diffusion plate 231.

The reflection sheet 29 has, similar to Embodiment 1, the plurality of convex parts 29b, 29b, . . . and 29b which extend from each long-side of the bottom part 29a, and the shape of each convex part 29b is a substantially rectangular shape as a whole.

However, in the liquid crystal television 100 according to Embodiment 3 of the present invention, circular lacking parts 29c copying the notches 231a, 231a, . . . and 231a are formed in each convex part 29b. In other words, the lacking parts 29c, 29c, . . . and 29c are formed so that the shape of the concave part thereof is a circle in the thickness direction of the reflection sheet 29. Each lacking part 29c is fitted to an outer circumference of the positioning part 224, such that the reflection sheet 29 is positioned in the backlight chassis 22.

Due to having the above-described configuration, in the liquid crystal television 100 according to Embodiment 3 of the present invention, as described above, it is possible to prevent the concave parts due to the notches from being observed by the viewer as the dark regions, which will be described in detail below with reference to FIG. 5.

That is, in the liquid crystal television 100 according to Embodiment 3 of the present invention, in the direction in which the diffusion plate 231 and the reflection sheet 29 face each other, the lacking parts 29c, 29c, . . . and 29c are disposed in the convex parts 29b, 29b, . . . and 29b of the reflection sheet 29, at the positions corresponding to the notches 231a, 231a, . . . and 231a of the diffusion plate 231. Further, in the facing direction, the concave part 292 of the reflection sheet 29 is disposed at the position corresponding to the residual edge part 231b of the diffusion plate 231.

Therefore, in the vicinity of the concave parts due to the notches 231a, 231a, . . . and 231a of the diffusion plate 231, the light reflectance is increased by the convex parts 29b, 29b, . . . and 29b of the reflection sheet 29. In addition, the concave part 292 of the reflection sheet 29 is disposed at the position corresponding to the residual edge part 231b of the diffusion plate 231, and the bottom 222 of the backlight chassis 22 is exposed, such that the light reflectance is decreased. Thereby, it is possible to prevent an occurrence of unevenness in the end part of the long-side of the diffusion plate 231, and maintain good display quality.

Further, in the liquid crystal television 100 according to Embodiment 3 of the present invention, the shape of the concave part due to the notches 231a, 231a, . . . and 231a is formed so as to be a circle in the thickness direction of the diffusion plate 231. Therefore, as compared to the case that the shape of such the concave part is a rectangle, it is possible to reduce a corner portion which may become the dark region, as well as workability may be improved and a strength may be increased.

Further in the liquid crystal television 100 according to Embodiment 3 of the present invention, the circular lacking parts 29c copying the notches 231a, 231a, . . . and 231a are formed in each convex part 29b, such that, similar to Embodiment 2, property of concealing the unevenness due to the dark region caused by the notch may be more increased.

The same parts as those in Embodiment 1 will be denoted by the same reference numerals, and will not be described in detail.

Embodiment 4

In the liquid crystal television 100 according to Embodiment 1, the case that, in the direction in which the diffusion plate 231 and the reflection sheet 29 face each other, the shape of each convex part 29*b* of the reflection sheet 29, and the shape of the concave part due to each notch 231*a* of the diffusion plate 231 are the rectangular shape having the size substantially equal to each other, and these parts are disposed so as to match with each other has been described as an example, but the present invention is not limited thereto.

Figure 6:
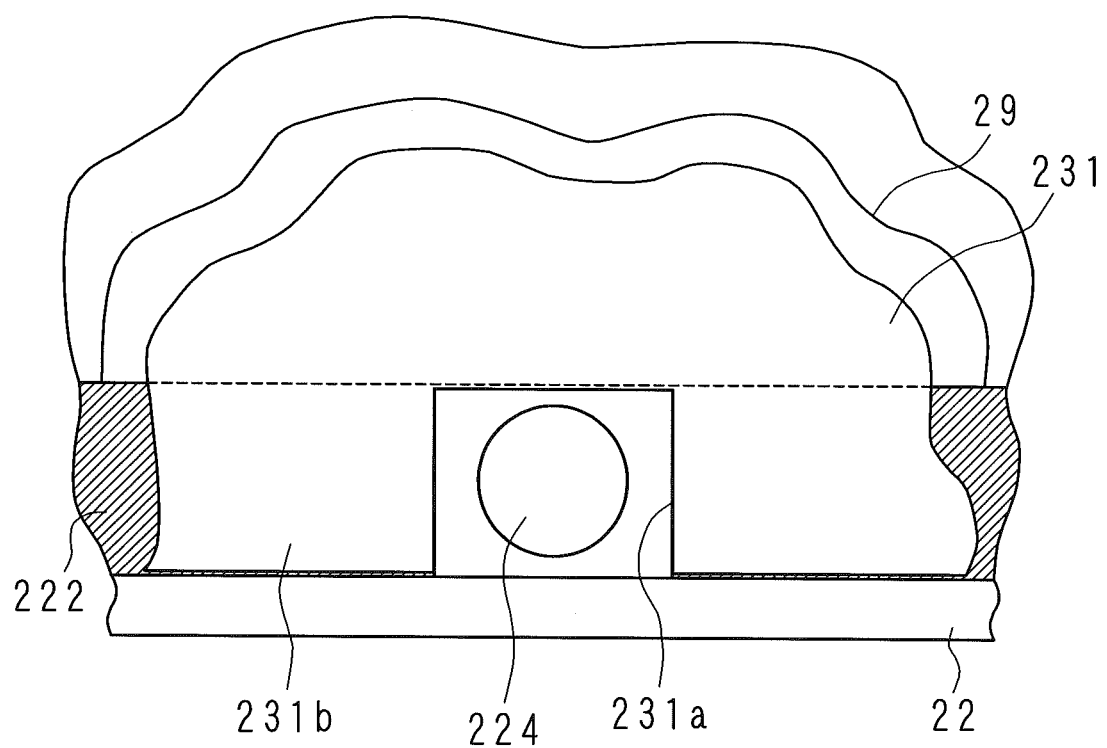
FIG. 6 is a partial view schematically illustrating a state in which a diffusion plate and a reflection sheet are stored, in a liquid crystal television according to Embodiment 4 of the present invention.

FIG. 6 is a partial view schematically illustrating a state in which a diffusion plate 231 and a reflection sheet 29 are stored, in a liquid crystal television 100 according to Embodiment 4 of the present invention.

In the liquid crystal television 100 according to Embodiment 4 of the present invention, the diffusion plate 231 has notches 231*a*, 231*a*, . . . and 231*a* which are formed at three places of the edge part of each long-side, so as to correspond to the positioning parts 224, 224, . . . and 224 of the backlight chassis 22. The notches 231*a*, 231*a*, . . . and 231*a* are provided at appropriate positions, so as to be engaged with the positioning parts 224, 224, . . . and 224, when the diffusion plate 231 is stored in the backlight chassis 22.

In the liquid crystal television 100 according to Embodiment 4 of the present invention, the shape of the concave parts due to the notches 231*a*, 231*a*, . . . and 231*a* is formed so as to be, for example, a rectangle in the thickness direction of the diffusion plate 231.

In addition, the reflection sheet 29, unlike Embodiments 1 to 3, does not have the convex part 29*b*. Therefore, in the liquid crystal television 100 according to Embodiment 4 of the present invention, the bottom 222 of the backlight chassis 22 is exposed at the positions corresponding to the residual edge part 231*b* of the diffusion plate 231.

In the liquid crystal television 100 according to Embodiment 4 of the present invention, as described above, a portion of the bottom 222 exposed at the positions corresponding to the residual edge part 231*b* of the diffusion plate 231 is printed with gray or black paints.

Due to having the above-described configuration, in the liquid crystal television 100 according to Embodiment 4 of the present invention, as described above, it is possible to prevent the concave parts due to the notches from being observed by the viewer as the dark regions, which will be described in detail below with reference to FIG. 6.

That is, in the liquid crystal television 100 according to Embodiment 4 of the present invention, in the direction in which the diffusion plate 231 and the reflection sheet 29 face each other, a portion of the bottom 222 which is printed with a film of gray or black paints is exposed at the positions corresponding to the residual edge part 231*b* of the diffusion plate 231.

Therefore, as the gray or black bottom 222 (film) is exposed to at the position corresponding to the residual edge part 231*b* of the diffusion plate 231, the light reflectance in such the portion is decreased. Thereby, property of concealing the dark region in the vicinity of the concave parts due to the notches 231*a*, 231*a*, . . . and 231*a* of the diffusion plate 231 may be increased. Thereby, it is possible to prevent an occurrence of unevenness in the end part of the long-side of the diffusion plate 231, and maintain good display quality.

In the above description, the case in which the portion of the bottom 222 is printed with the film of gray or black paints has been described as an example, but the present invention is not limited thereto. For example, the bottom may be applied with a light absorbing agent, and any light absorbent may be used so long as it has reduced reflectance.

The present invention is not limited to the above description. The film of the backlight chassis 22 may be configured so as to have a constant reflection spectral distribution characteristic.

As described above, since the film has a constant reflection spectral distribution characteristic, the localized coloring may be avoided. That is, by increasing the reflectance, the amount of light in the notches 231*a*, 231*a*, . . . and 231*a* of the diffusion plate 231 is increased, and thereby the display unevenness becomes hard to be observed by the viewer.

Figure 7:
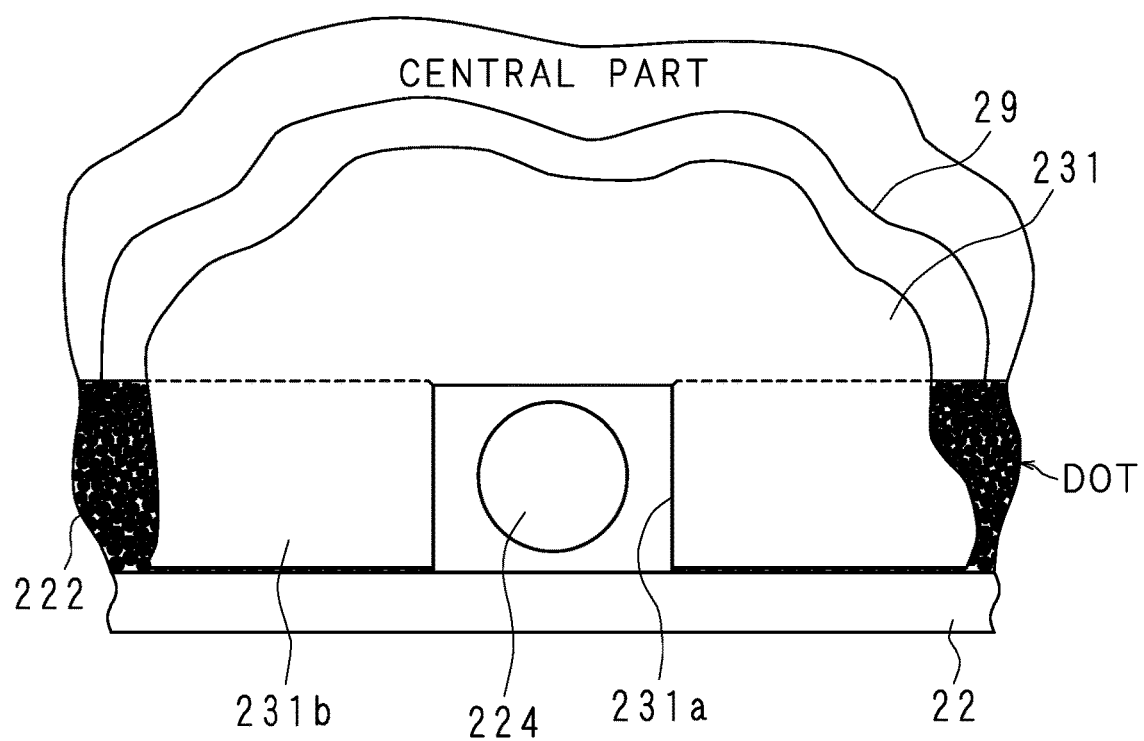
FIG. 7 is a partial view schematically illustrating a state in which a diffusion plate and a reflection sheet are stored, in a liquid crystal television according to another Embodiment of the present invention.

In addition, the film of the backlight chassis 22 may be configured so as to be formed by printing a plurality of fine dots. In this case, it is easy to provide concentration difference in print, and coloring of the regions other than the notches 231*a*, 231*a*, . . . and 231*a* of the diffusion plate 231 is prevented, and thereby the display unevenness becomes hard to be observed by the viewer. See FIG. 7.

Further, in this case, the diameter of the dots may be configured so as to be smaller toward the central part of the backlight chassis 22. See FIG. 7. In this case, it is easy to control the concentration difference in print.

The same parts as those in Embodiment 1 will be denoted by the same reference numerals, and will not be described in detail.

Figure 8:
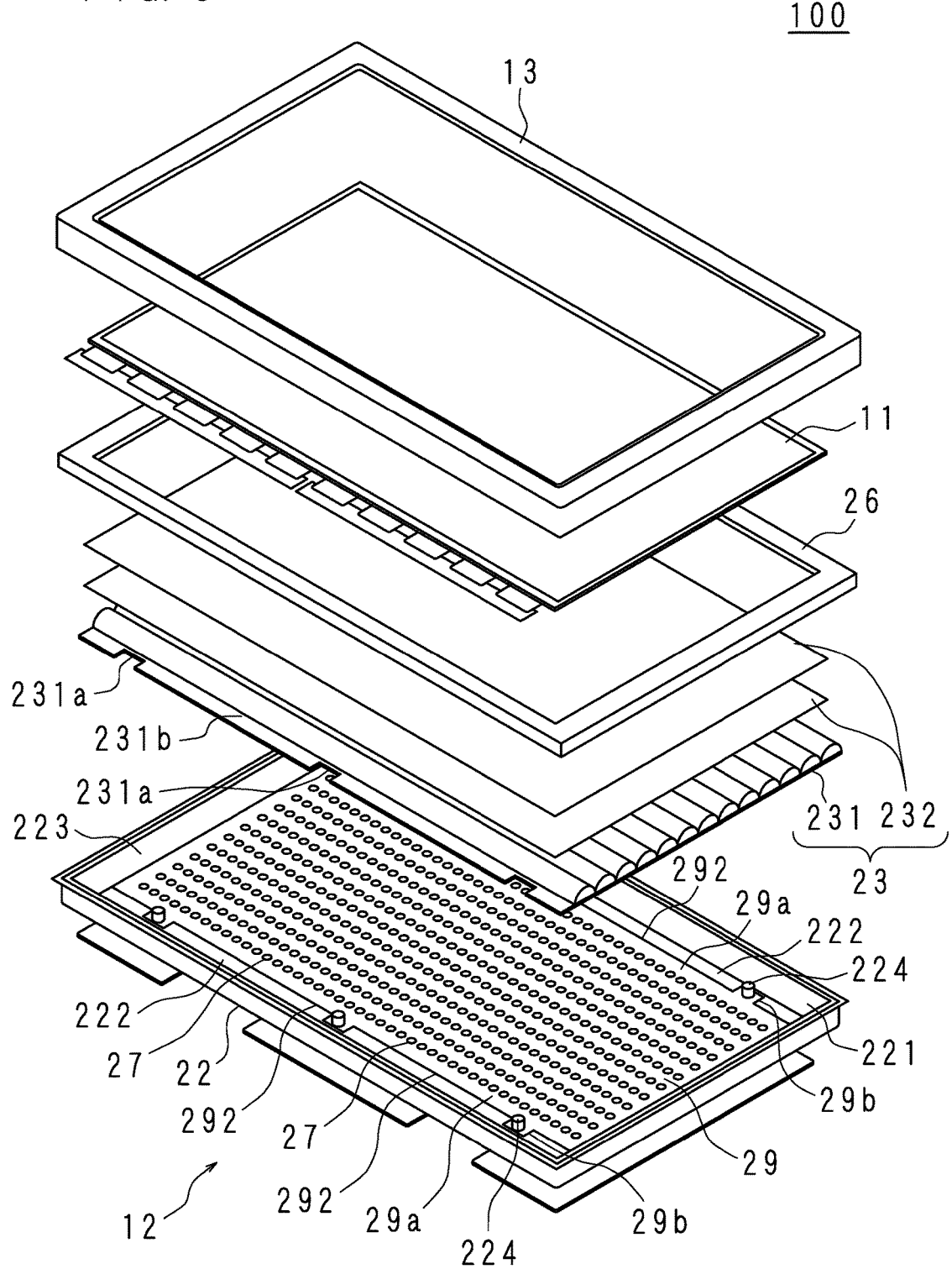
FIG. 8 is an exploded perspective view illustrating a configuration of main components of a liquid crystal television according to another Embodiment of the present invention.

In addition, the present invention is not limited to the above description. For example, in the diffusion plate 231, one surface thereof from which light made incident from the light source 27 side is emitted toward the optical sheet 232 may be configured so as to have a lens shape. See FIG. 8.

That is, the one surface of the diffusion plate 231 is configured so as to have a shape of a plurality of cylindrical lenses. Thereby, since the unevenness which is introduced into the display region of the liquid crystal panel 11 to be observed by a user is diffused, the display unevenness becomes hard to be observed by the user.

Figure 9:
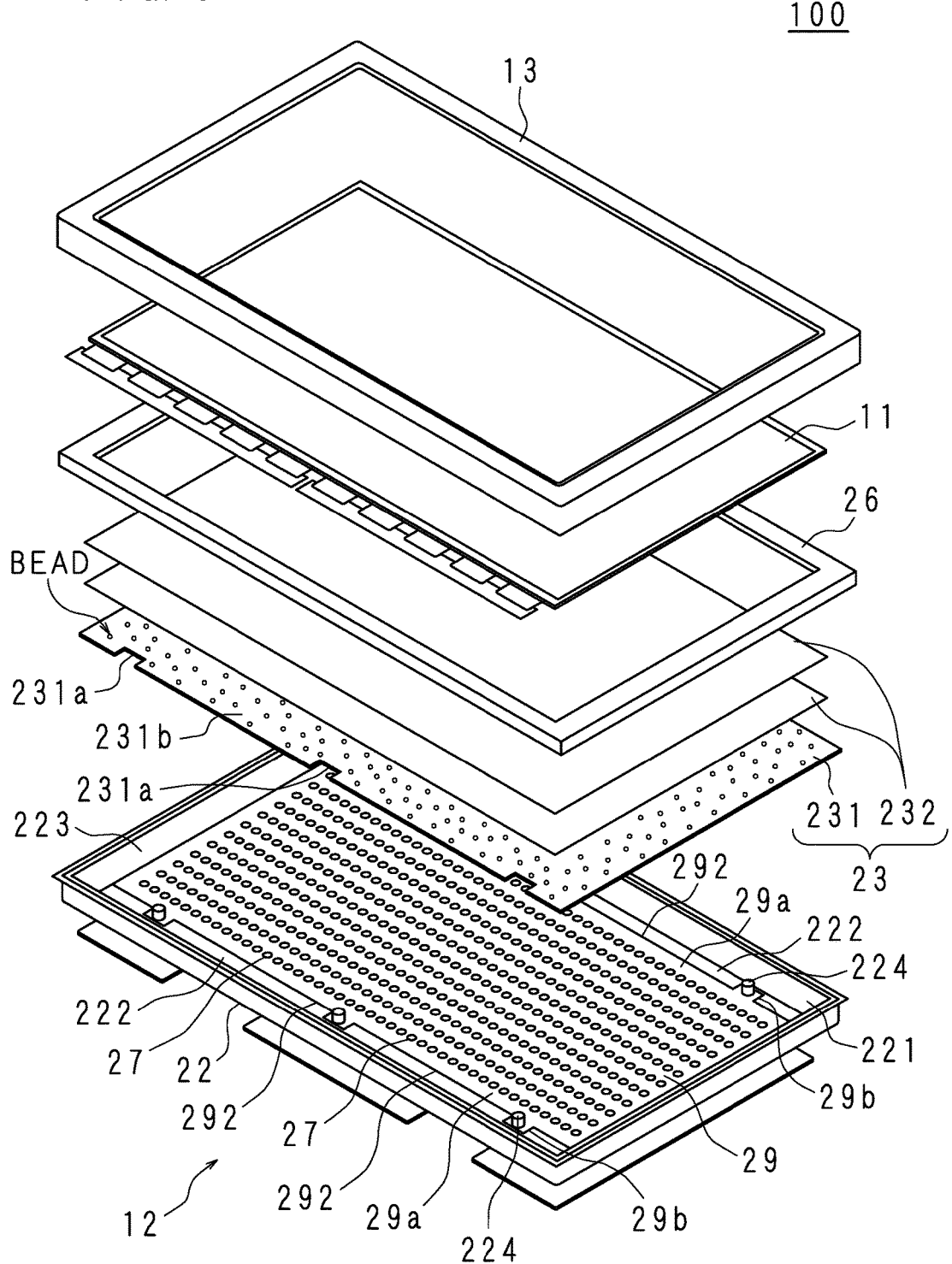
FIG. 9 is an exploded perspective view illustrating a configuration of main components of a liquid crystal television according to another Embodiment of the present invention.

Further, the present invention is not limited to the above description, the one surface of the diffusion plate 231 may be configured so as to have diffusion beads. See FIG. 9.

The diffusion beads may be, for example, spherical particles which have an average particle diameter of 5 to 40 μm, and are made of at least one selected from silica, crosslinked polymethyl methacrylate, crosslinked polystyrene, and calcium carbonate, etc. In particular, beads having a narrow particle diameter distribution with a refractive index of 1.4 to 1.7 are preferably used.

Thereby, by providing the diffusion beads on the one surface of the diffusion plate 231, it is possible to diffuse the unevenness which is introduced into the display region, and thereby the display unevenness becomes hard to be observed by the user.

Figure 10:
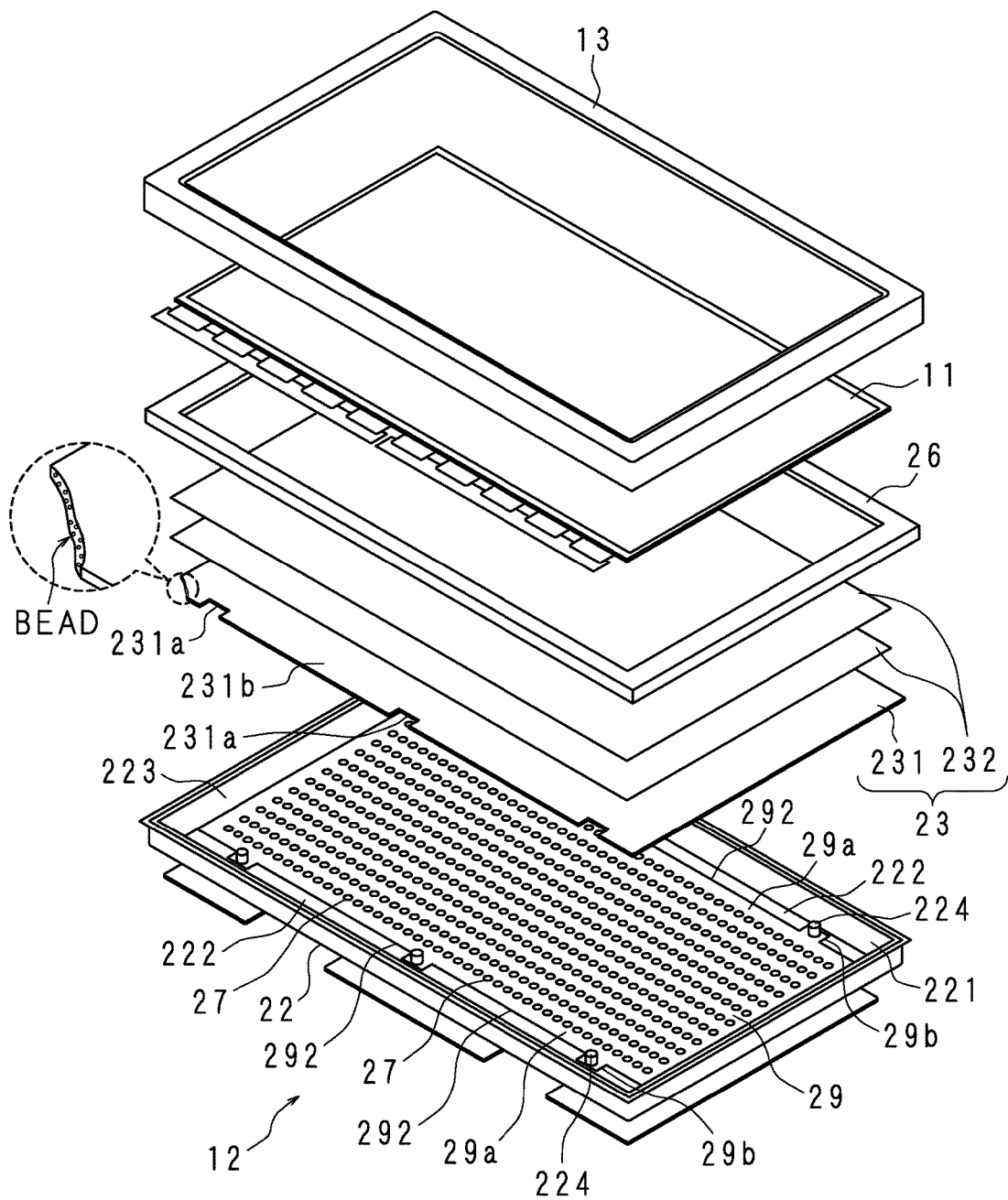
FIG. 10 is an exploded perspective view illustrating a configuration of main components of a liquid crystal television according to another Embodiment of the present invention.

Further, the present invention is not limited to the above description, the diffusion plate 231 itself may be configured so as to include the diffusion beads. See FIG. 10.

In this case, the diffusion beads may be, for example, particles which have an average particle diameter of 500 nm to 100 μm, and are made of at least one selected from silica, or acrylic, and an organic-inorganic composite (for example, a silica acrylic composite), etc. In addition, perfectly-spherical particles having a narrow particle diameter distribution with a refractive index of 1.4 to 1.7, and exhibiting solvent resistance, heat resistance and light resistance are preferably used.

Thereby, due to the diffusion plate 231 including the diffusion beads, it is possible to increase a diffusion effect within the diffusion plate 231, and diffuse the unevenness which is introduced into the diffusion plate 231, and thereby the display unevenness becomes hard to be observed by the user.

It is noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A light source device which includes a light source, a diffusion member configured to diffuse light from the light source, a reflection sheet configured to reflect the light from the light source to the diffusion member, a storage housing in which the diffusion member and the reflection sheet are stored to face each other, and positioning parts which are provided in the storage housing and position the diffusion member and the reflection sheet in the storage housing,
wherein
the diffusion member is provided with notches corresponding to the positioning parts in one side surface part thereof,
the reflection sheet has a flat surface facing the diffusion member, and concaves and convexes which are protruding and recessed along the flat surface in one edge part of the flat surface corresponding to the one side surface part of the diffusion member, and
the notches of the diffusion member are disposed to correspond to convex parts of the one edge part of the reflection sheet in the facing direction in which the diffusion member and the reflection sheet face each other.

2. The light source device according to claim 1, wherein residual part other than the notches of the one side surface part of the diffusion member is disposed to correspond to concave parts of the one edge part of the reflection sheet in the facing direction.

3. The light source device according to claim 1, wherein the convex parts of the reflection sheet have lacking parts having a similar figure to the notches at positions corresponding to the notches of the diffusion member in the facing direction.

4. The light source device according to claim 3, wherein the lacking part of the reflection sheet is substantially a triangle.

5. The light source device according to claim 3, wherein the lacking part of the reflection sheet is substantially a circle.

6. The light source device according to claim 1, wherein the diffusion member includes one surface to emit light, which has a lens shape.

7. The light source device according to claim 1, wherein the diffusion member includes one surface to emit light, which has diffusion beads.

8. The light source device according to claim 1, wherein the diffusion member includes the diffusion beads.

9. A display apparatus comprising:
the light source device according to claim 1, and
a display panel which is provided on one surface side of the diffusion member, and displays an image using light made incident thereon through the diffusion member.

10. A light source device which includes a light source, a diffusion member configured to diffuse light from the light source, a reflection sheet configured to reflect the light from the light source to the diffusion member, a storage housing in which the diffusion member and the reflection sheet are stored to face each other, and positioning parts which are provided in the storage housing and position the diffusion member and the reflection sheet in the storage housing,
wherein
the diffusion member is provided with notches corresponding to the positioning parts in one side surface part thereof,
the reflection sheet has a flat surface facing the diffusion member, and concaves and convexes which are protruding and recessed along the flat surface in one edge part of the flat surface corresponding to the one side surface part of the diffusion member,
the notches of the diffusion member are disposed to correspond to convex parts of the one edge part of the reflection sheet in the facing direction in which the diffusion member and the reflection sheet face each other, and the convex part of the reflection sheet includes a fluorescent agent.

11. The light source device according to claim 10, wherein the fluorescent agent has a constant reflection spectral distribution characteristic.

12. A light source device which includes a light source, a diffusion member configured to diffuse light from the light source, a reflection sheet configured to reflect the light from the light source to the diffusion member, a storage housing in which the diffusion member and the reflection sheet are stored to face each other, and positioning parts which are provided in the storage housing and position the diffusion member and the reflection sheet in the storage housing,
wherein the diffusion member is provided with notches corresponding to the positioning parts in one side surface part thereof,
the diffusion member has residual part other than the notches of the one side surface part, which faces a bottom of the storage housing in the facing direction in which the diffusion member and the reflection sheet face each other, and
a film is formed on a portion of the bottom of the storage housing, the portion facing the residual part, and has a lower reflectance than the other portions.

13. The light source device according to claim 12, wherein the film of the storage housing has a constant reflection spectral distribution characteristic.

14. The light source device according to claim 12, wherein the film of the storage housing is formed by printing of a plurality of dots.

15. The light source device according to claim 14, wherein the dots have a diameter which is configured so as to be decreased toward a central part of the bottom of the storage housing.

16. The light source device according to claim 12, wherein the diffusion member includes one surface to emit light, which has a lens shape.

17. The light source device according to claim 12, wherein the diffusion member includes one surface to emit light, which has diffusion beads.

18. The light source device according to claim 12, wherein the diffusion member includes the diffusion beads.

* * * * *